May 16, 1939.　　　T. L. RENFRO　　　2,158,803
OIL SAMPLER
Filed April 8, 1938
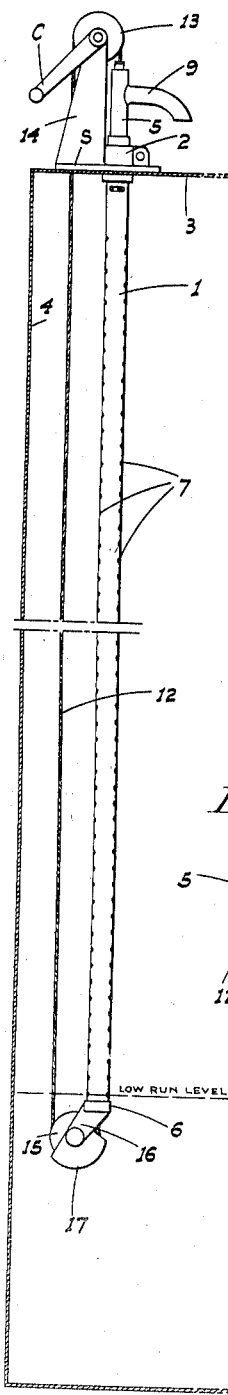
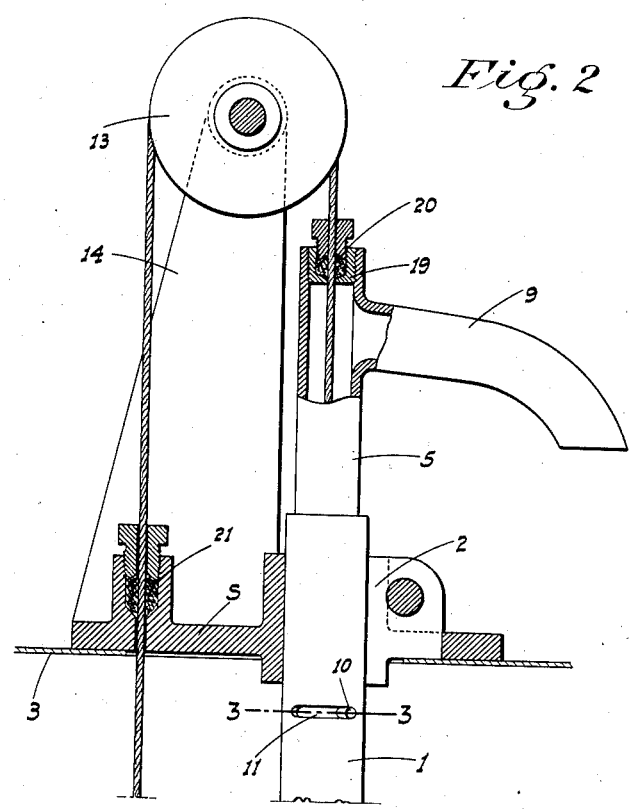
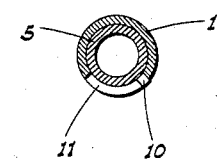
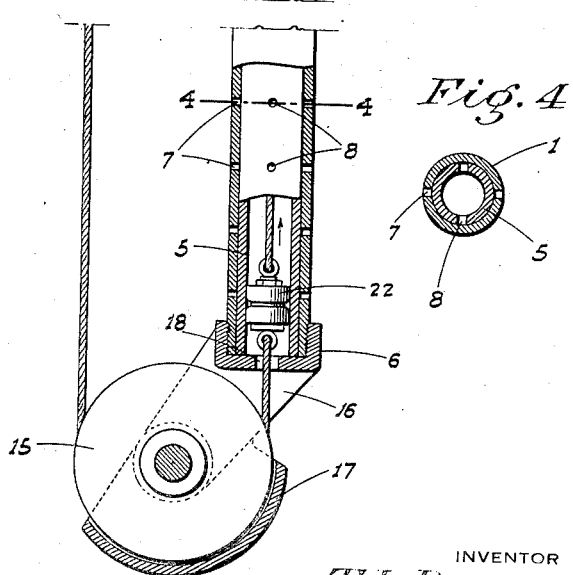
INVENTOR
T. L. Renfro
BY
ATTORNEY Patented May 16, 1939

2,158,803

UNITED STATES PATENT OFFICE 2,158,803

OIL SAMPLER

Thomas L. Renfro, Taft, Calif., assignor of one-half to William H. Nicholson, Taft, Calif.

Application April 8, 1938, Serial No. 200,971

11 Claims. (Cl. 137—18)

This invention relates generally to a device for taking oil samples and in particular the invention pertains to a device for taking oil samples from a storage tank or the like.

In the oil industry it is the custom for a prospective purchaser of oil to first have samples taken in order to determine the average quality of the oil in a given tank. As crude oil stratifies qualitatively when in a storage tank, vertically spaced take off valves now are used and a given amount of oil withdrawn from each valve, the amounts mixed together, and then tested to determine the average quality of the oil in the tank. This manner of sampling is subject to the objection that the quantity withdrawn at each level may vary either accidentally or intentionally, resulting in an incorrect test result.

It is therefore the principal object of this invention to provide an oil sampling device which is arranged so as a vertically extending "core" of oil may be withdrawn from a tank, such "core" including a representative sample of equal quantity from each stratum of oil in the tank. In this manner the seller as well as buyer is assured of proper sampling and a correct test report on any given tank of oil.

Another object of the invention is to provide an oil sampling device which may be employed as permanent tank equipment, or may be used as a portable unit.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a foreshortened, side elevation of the device as installed in an oil tank.

Figure 2 is a foreshortened and enlarged side elevation, partly in section, of the device.

Figure 3 is a cross section on line 3—3 of Fig. 2.

Figure 4 is a cross section on line 4—4 of Fig. 2.

Referring now more particularly to the characters of reference on the drawing, the numeral 1 indicates a tubular casing suspended vertically from an adjustable holding and clamping collar unit 2 formed with a supporting plate S disposed on the top 3 of an oil tank 4. The casing is of sufficient length to extend from its lower end at a point at the "low run level" in the tank upward to a termination a short distance above holding collar 2.

A cylinder 5 is disposed within casing 1 with a close running and turning fit; the cylinder being held in proper position relative to the casing by a retaining cap 6 threaded on the lower end of the casing and forming a support for the lower end of said cylinder. The upper end of the cylinder terminates above the upper end of the casing as shown.

Extending down to adjacent their lower ends from a point adjacent but below the tank top 3, the casing and cylinder are each formed with a longitudinal row of equally spaced openings 7 and 8 respectively of relatively small size; the openings 7 in the casing being normally in register with the openings 8 in the cylinder. A discharge spout 9 extends substantially radially outward from the cylinder above the upper end of the casing, said spout also serving as a handle whereby the cylinder may be rotated within said casing. Rotation of the cylinder is limited to approximately a 90° movement by means of a radial pin 10 on the cylinder riding in a slot 11 in the casing.

An endless cable 12 is carried on an upper pulley 13 journaled between spaced bracket arms 14 upstanding from plate S, and a lower pulley 15 journaled between other bracket arms 16 which extend at a downward slope in spaced relation from cap 6; these pulleys being so disposed that one reach of the cable extends centrally and longitudinally through the cylinder, while the other reach is disposed outside the casing.

A guard 17 formed with the bracket arms 16 prevents accidental escape of the cable from pulley 15. The cap 6 is formed with a central opening 18 through which the cable passes, and the upper end of the cylinder has a plug 19 threaded thereinto; said plug including an adjustable cable wiping gland 20 through which said one reach of the cable passes. Another similar cable wiping gland 21 is mounted on plate S and cooperates with the other reach of the cable.

A piston 22, preferably of the opposed resilient cup type, is interposed in said one reach of the cable and is slidably disposed in the cylinder, the piston being normally positioned adjacent the bottom of said cylinder.

To withdraw a "core" of oil from the tank as a representative sample, the cylinder is rotated by means of spout 9 until rows of openings 7 and 8 are no longer in register. Thereafter pulley 13 is rotated by suitable means, such as a crank C, in a direction to draw piston 22 upward through the cylinder. The "core" or sample of oil, which has previously been isolated from the remainder of oil in the tank, is thus discharged from spout 9 into a receiving container (not shown).

After the sample has been taken the piston is returned to the lower end of the cylinder, and the cylinder rotated so that the openings 7 and 8 are again in register to allow a subsequent oil "core" to flow into the cylinder. Glands 20 and 21 keep the exposed portion of the cable clean and free of the oil.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A device for removing a representative sample of fluid from a tank, said device comprising a cylinder adapted to depend into the fluid from above, a casing in which the cylinder is turnable, both the casing and cylinder having a longitudinal row of ports therethrough and in position to register when the casing and cylinder are in predetermined relative position, these ports when in register providing access of the fluid into the cylinder, a piston slidably disposed in the cylinder, and means to reciprocate the piston in the cylinder; there being a fluid discharge member extending from the cylinder above the fluid level.

2. A device as in claim 1 in which the cylinder extends above the casing; and said member comprises a substantially radial spout by means of which the cylinder may be rotated.

3. A device for removing a representative sample of fluid from a tank, said device comprising a cylinder adapted to depend into the fluid from above, a casing about the cylinder, both the casing and cylinder having a longitudinal row of ports therethrough and in position to register when the casing and cylinder are in predetermined relative position, said casing and cylinder being relatively movable to place the ports into and out of register these ports when in register providing access of the fluid into the cylinder, a piston slidably disposed in the cylinder, an endless cable having one reach thereof extending through the cylinder, the piston being interposed in said one reach of the cable, a cable pulley journaled adjacent each end of the casing and cylinder unit, the cable being trained thereover, and means to rotate the upper pulley and drive the cable; there being a fluid discharge member extending from the cylinder above the fluid level.

4. A device as in claim 1 including means preventing rotation of the cylinder in one direction beyond a port registering position, and preventing rotation in the other direction beyond a predetermined arc of movement.

5. A device for removing a representative sample of fluid from a tank, said device comprising a vertical casing adapted to depend from the tank top into the fluid, a cylinder of substantially the same length as the casing disposed therein in close fitting but turnable relation, a cap secured on the lower end of the casing and providing a stop for the cylinder, said cap having a central opening, longitudinally and symmetrically spaced ports in both the casing and cylinder and normally in register, a piston in the cylinder, an endless cable having one reach thereof passing through the cylinder longitudinally thereof and through the opening in the cap, the piston being interposed in said reach of the cable, pulleys for each end of the cable disposed beyond the ends of the casing and cylinder unit, means to drive the cable, and means to rotate the cylinder from a port registering position to a non-registering position.

6. A device as in claim 3 including a cable wiping gland surrounding each reach of the cable adjacent the level of the tank top.

7. A device for removing a representative sample of fluid from a tank comprising a cylinder adapted to depend into the fluid from above, a casing about the cylinder, the casing and cylinder each having a longitudinal row of ports therethrough arranged to register when the casing and cylinder are in a predetermined relative position and said casing and cylinder being relatively movable to place the ports into and out of register, a piston slidably disposed in the cylinder, there being a fluid discharge member extending from the cylinder above the fluid level and means to reciprocate the piston in the cylinder.

8. A device for removing a representative sample of fluid from a tank comprising a tubular member adapted to depend into the fluid from above, another tubular member about the first member, said members each having longitudinally extending porting means arranged to register when said members are disposed in a predetermined position relative to each other, said members being relatively movable to place said porting means into and out of register, a piston slidable in the inner member, means to reciprocate the piston and a fluid discharge element extending from one member above the fluid level.

9. A device as in claim 8 in which said element is in the form of a radial spout and is rigid with that member which is movable.

10. A device for removing a representative sample of fluid from a tank comprising a support adapted to be mounted on the top of a tank over an opening therein, a casing fixed in and depending from the support, a cylinder turnable in and projecting above the casing, the casing and cylinder having longitudinally extending porting means adapted to register when the casing and cylinder are turned to a predetermined position relative to each other, a discharge spout projecting from the cylinder above the casing, a piston slidable in the cylinder, a pair of pulleys beyond the ends of the cylinder and casing, one pulley being mounted on the support and the other on the lower end of the casing, said pulleys on one side extending to the axial plane of the cylinder, an endless cable passing about the pulleys and in one run of which the piston is interposed and means to rotate the upper pulley.

11. A device for removing a representative sample of fluid from a tank comprising a tubular member adapted to depend into the fluid from above, another tubular member about the first member, said members each having longitudinally extending porting means arranged to register when said members are disposed in a predetermined position relative to each other, said members being relatively movable to place said porting means into and out of register, a support adapted to be mounted on top of a tank over an opening therein and from which said other tubular member is suspended in supporting relation, a piston slidable in the inner member, a fluid discharge spout extending from one member above the support, and means mounted in unitary connection with the support and one member to reciprocate the piston.

THOMAS L. RENFRO.